W. L. CALLAHAN & J. W. RAYNOR.
AUTOMATIC WELDING MACHINE.
APPLICATION FILED OCT. 10, 1913. RENEWED MAY 5, 1917.
1,262,749.
Patented Apr. 16, 1918.
5 SHEETS—SHEET 1.
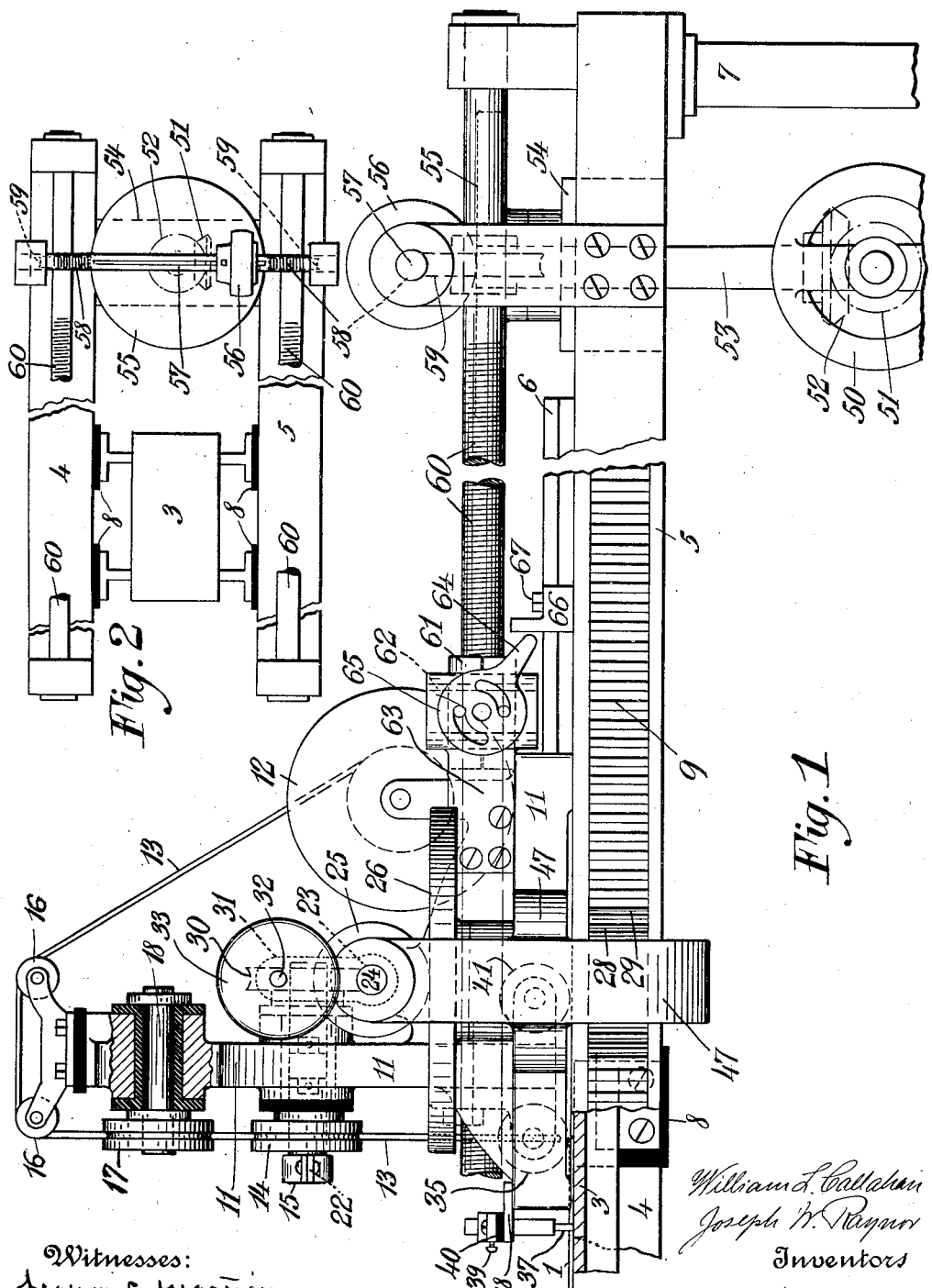

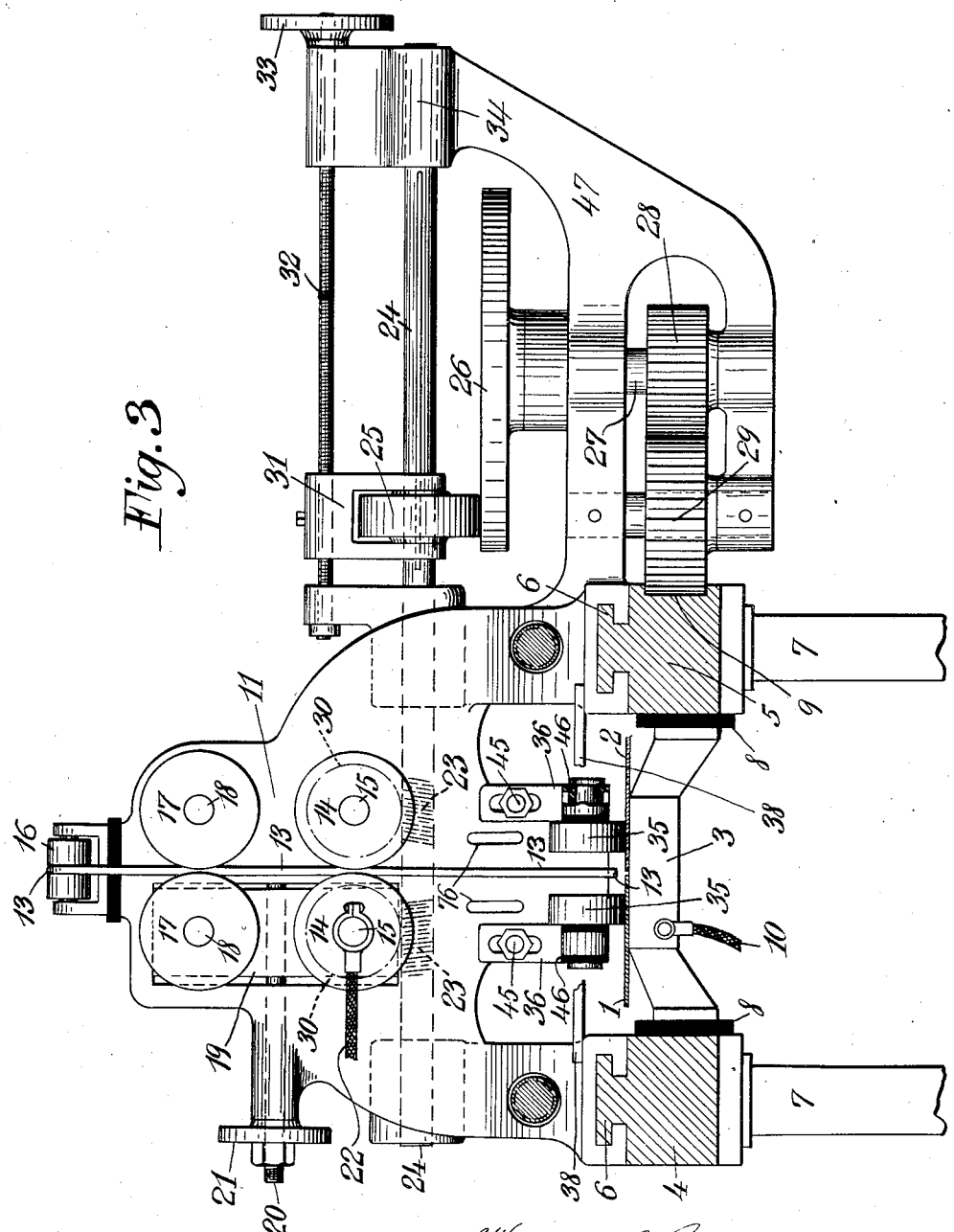

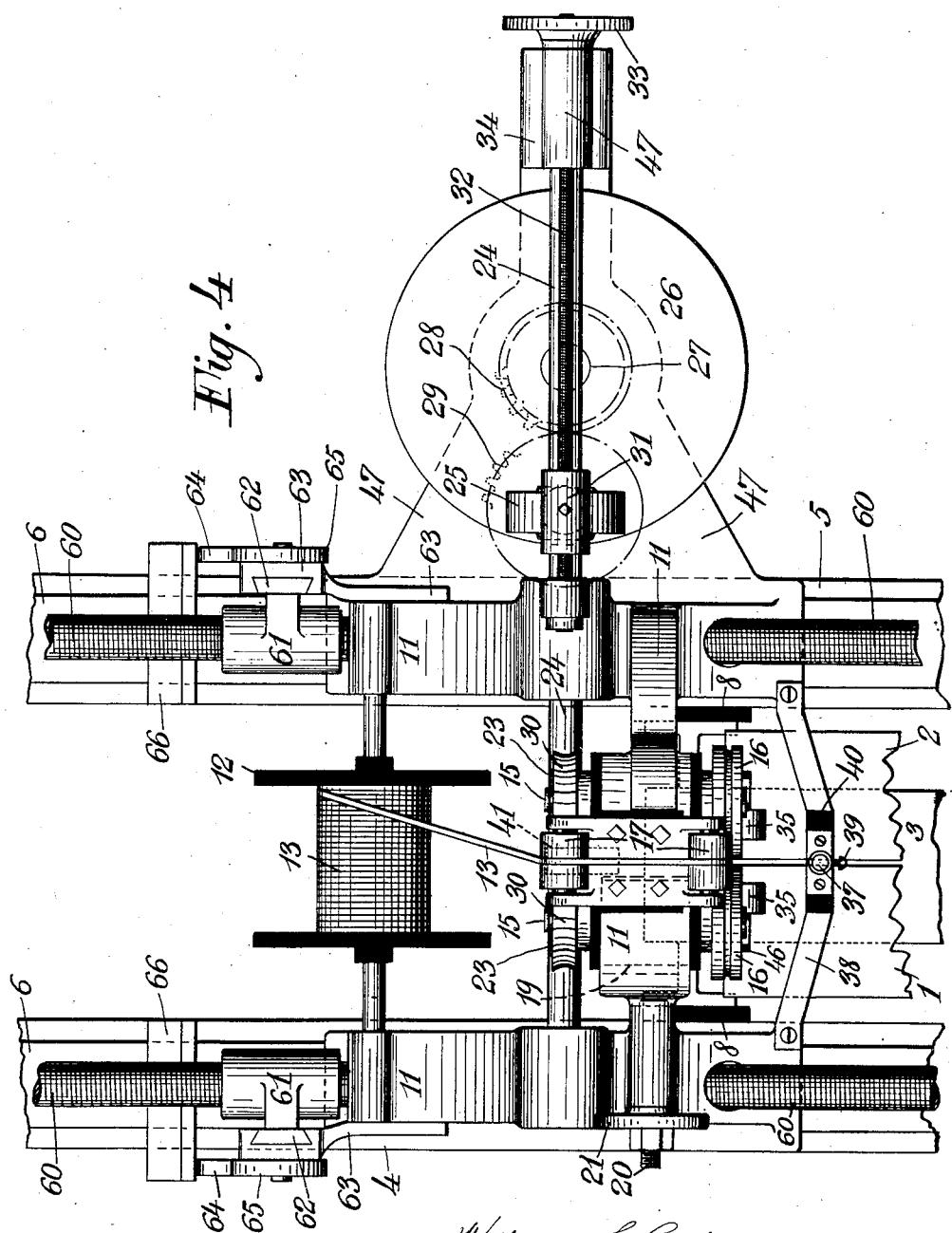

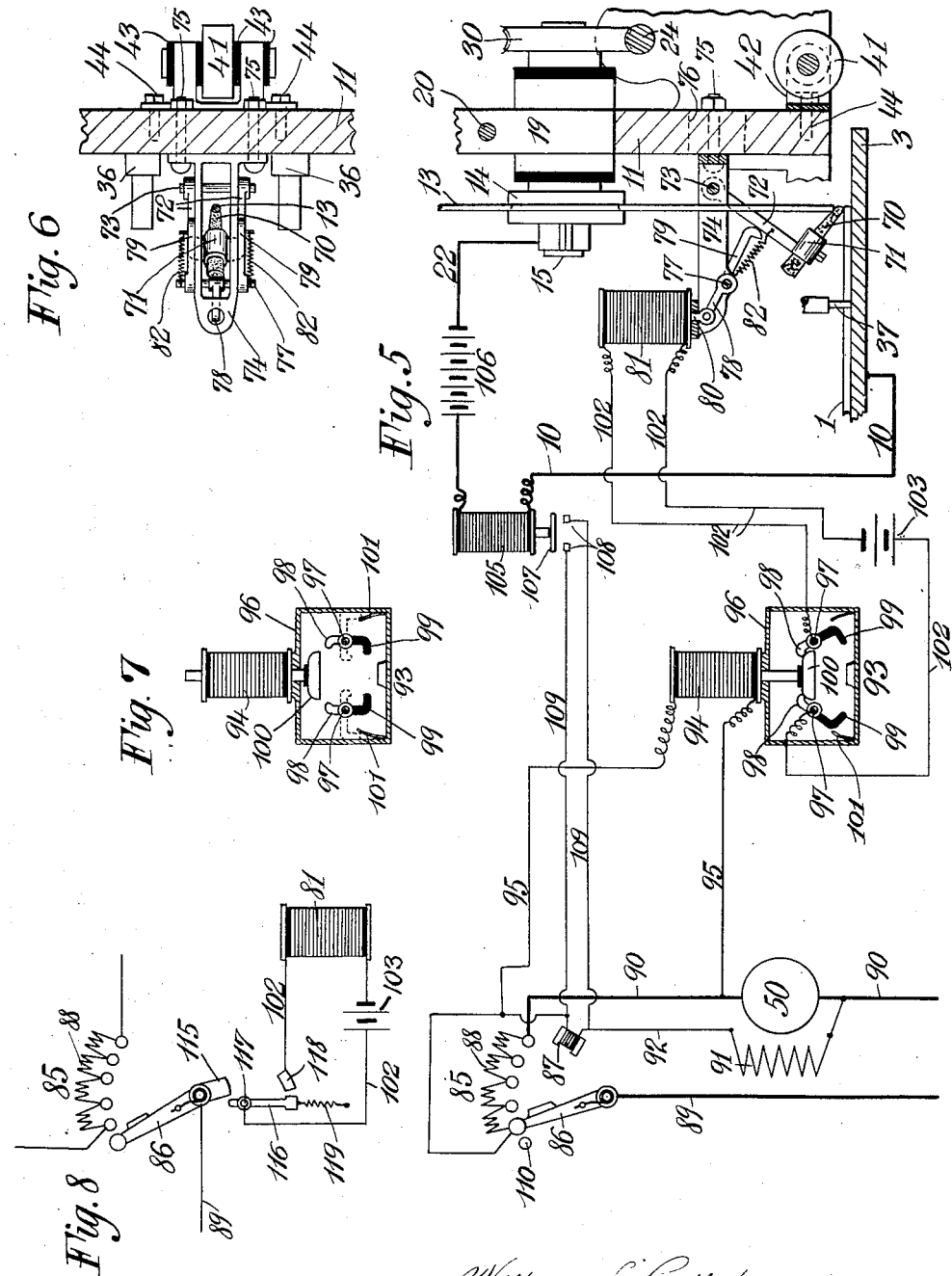

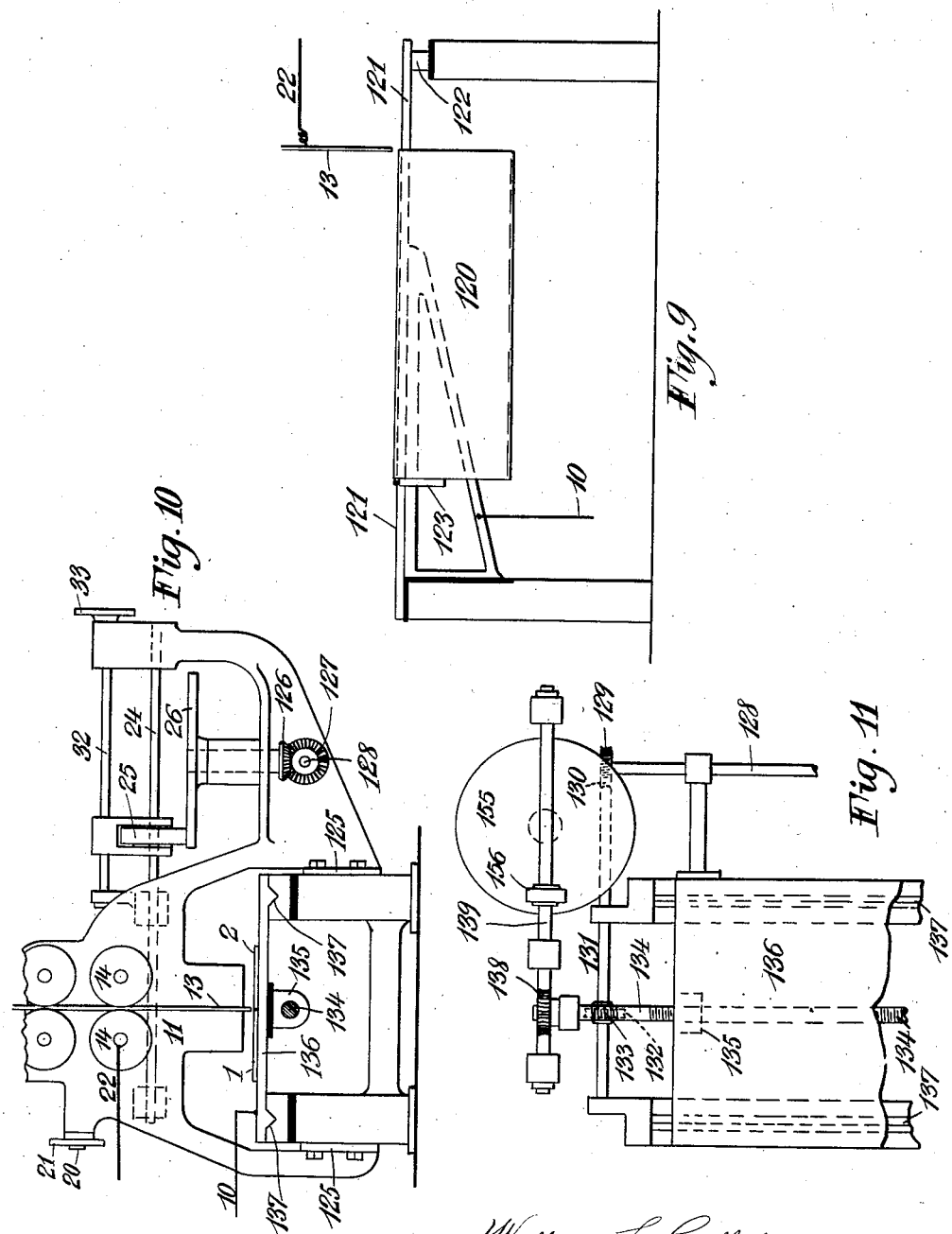

UNITED STATES PATENT OFFICE.

WILLIAM L. CALLAHAN, OF GARWOOD, AND JOSEPH W. RAYNOR, OF PLAINFIELD, NEW JERSEY, ASSIGNORS TO C. & C. ELECTRIC & MANUFACTURING COMPANY, A CORPORATION OF NEW JERSEY.

AUTOMATIC WELDING-MACHINE.

1,262,749.　　　　　　　Specification of Letters Patent.　　Patented Apr. 16, 1918.

Application filed October 10, 1913, Serial No. 794,361.　Renewed May 5, 1917.　Serial No. 166,766.

*To all whom it may concern:*

Be it known that we, WILLIAM L. CALLAHAN, of Garwood, Union county, New Jersey, and JOSEPH W. RAYNOR, of Plainfield, Union county, New Jersey, citizens of the United States of America, have invented certain new and useful Improvements in Automatic Welding-Machines, of which the following is a specification.

This invention relates to an automatic welding machine and the object of the invention is to provide a machine for automatically welding articles together by means of an electric arc drawn between a metallic electrode and the articles to be welded. Many of the features of this invention are, however, also applicable to a machine for automatically welding by means of an arc drawn between the articles to be welded and a carbon electrode, and may be found equally valuable and applicable to other types of welding machines.

The art of electric arc welding as at present practised consists in manually operating the movable electrode to draw the arc and move it over the joint to be welded, and while skilled operators are able to obtain good results, yet it is very difficult, if not impossible, to weld successfully in cases where the joints to be welded are very long, or where the conditions under which the work is done are such as to cause the operator to tire quickly so that the welding operation becomes intermittent and irregular instead of continuous, or where the work to be done is of such a nature that the cost of manual labor is prohibitive.

It is well known that a perfect weld should be continuous and not intermittent because at the moment of drawing the arc the metal electrode sticks to the work when first making contact. This sticking causes a rather imperfect weld, the process being that of butt or incandescent welding with not enough current to generate sufficient heat. Only when the arc is drawn, after considerable effort at times, is enough heat generated to heat both of the articles to be welded and to fuse the metallic electrode. Consequently every start after the arc has broken is not as perfect in the weld as it should be and experienced welders work into the joint from the side in order to avoid imperfections.

This invention, therefore, is designed to provide a machine to perform automatic welding to avoid the aforesaid imperfections and other disadvantages of manual welding and whereby welding may be carried out on a large scale for commercial purposes and articles requiring a long continuous weld may be easily and quickly welded together.

To this end the invention is embodied in a suitable machine structure having means for supporting the articles to be welded, and means for supporting a metallic electrode in proper position to weld. The machine is further designed to either move the electrode along the joint to be welded or to move the articles to be welded while the electrode is stationary. Means are also provided whereby a continuous metallic electrode is fed automatically to the arc to avoid breaking the latter. Means are provided for drawing the arc automatically at the beginning of the operation and means are provided whereby the machine automatically ceases to operate when the arc breaks. Other means or elements necessary to the performance of arc welding by automatic machinery will appear as this specification proceeds while reference is had to the accompanying drawings illustrating the invention. It should be understood, however, that the drawing the arc automatically at the begin-ciples of machinery for automatic arc welding and in no wise as representing the only embodiments of the invention. In the drawings—

Figure 1 is a side view of an automatic welding machine embodying the invention with certain parts and details omitted.

Fig. 2 is a plan view of the frame of the machine including some details of the driving mechanism for operating the electrode along the joint.

Fig. 3 is a front view of the machine with parts in section and certain details omitted.

Fig. 4 is a plan view of the machine of the parts shown in Fig. 1.

Fig. 5 is a wiring diagram and shows in detail the mechanism for drawing the arc automatically at the beginning of the operation.

Fig. 6 is a plan view of the arc drawing mechanism.

Fig. 7 is a detail view of a make and break device illustrated in Fig. 5 but shows the parts in a different position.

Fig. 8 is a fragmentary diagram illustrating another type of make and break device.

Fig. 9 is a view showing a construction for supporting a cylinder to be welded.

Fig. 10 is a front view of a machine in which the work is moved relatively to the electrode, and Fig. 11 is a fragmentary plan view of the machine illustrated in Fig. 10.

The articles to be welded may have almost any conceivable shape and consequently the machine must be adapted to support different kinds of work. As illustrating two widely different kinds of work we have illustrated the supporting means in the first four figures as adapted to support straight or flat work such as plates and Fig. 9 shows a support suitable for round or cylindrical work. Besides these two instances almost any kind of a support may be used and will readily suggest itself to a skilled mechanic.

In the first instance two flat plates 1 and 2 are to be welded together. They will hereinafter be called the work and are laid on suitable work supporters 3 mounted on the main frame of the machine comprising the two carriage runways 4 and 5 provided with guides 6, 6. The runways are supported on suitable pedestals 7 resting on the floor. The work supporters are insulated from the machine at 8, 8. The runway 5 is provided with a rack 9 and the positive wire 10 of the arc circuit is suitably secured to a work supporter as shown in Fig. 3.

Upon the runways slides a carriage 11 provided with flanges which fits the guides 6. The carriage supports a drum 12 of non-conducting material upon which is wound the metal electrode 13 of suitable material and cross section and whereby a continuous supply of metallic electrode is assured. The electrode is fed to the work by means of feed rolls 14 supported on shafts 15 and guided in its travel by guide rolls 16, 16 and 17, 17, the latter being journaled on shafts 18, 18. The one feed roll 14 and the one guide roll 17 are carried in a movable bearing 19 adjustable in the carriage by a screw shaft 20 operated by a handwheel 21 thus allowing for different sizes of metallic electrode. The negative wire 22 of the arc circuit is secured to the one shaft 15 as shown in Fig. 3.

The feed roll shafts 15 carry worm gears 30 which are driven by worms 23 on the transverse shaft 24 mounted in the carriage and having an end bearing 34 in a bracket 47 which is a part of the carriage. The shaft 24 is driven by means of a friction roller 25 from a friction disk 26 on a shaft 27. This latter carries a gear 28 meshing with a gear 29 which in turn meshes with the aforesaid rack 9 on runway 5. When the carriage is moved the gear 29 rolls on the rack 9 and thus imparts motion to the gear 28.

The rotating speed of friction roller 25 may be adjusted to change the speed at which the feed rolls are driven from the shaft 24 and to this end the roller 25 may be moved radially on the disk 26 by the bifurcated block 31 which latter is adjusted by the screw shaft 32 operated by a handwheel 33. The roller 25 is splined to the shaft 24 so that when the screw shaft 32 is rotated either left or right the friction roller will be moved away from or toward the center of the driving disk 26. Consequently the speed of the roller and that of the shaft 24 is varied and with that the speed of the feed rolls 14. As will be seen from the drawings the speed adjusting means are carried by the bracket 47 on the carriage 11.

In order to keep the work in alinement under the electrode there is provided two work positioning rolls 35, 35 adjustably mounted on the carriage in brackets 36, 36. The rolls are insulated from the brackets as shown at 46. 37 is a spreader adjustably mounted on a crossbar 38 by means of a set screw 39 and insulated from the crossbar at 40. It serves to keep the plates apart a proper distance to insure good welding. If the work requires no spreader it may be removed quickly by loosening the set screw 39. The crossbar 38 is mounted on the carriage.

After the weld has been made it is desirable to smooth it down. To this end there is provided a follower or smoothing roll 41, see Figs. 5 and 6, mounted in a bracket 42 on the carriage. The roll 41 is insulated from the carriage as at 43 and may be adjusted to suit the height of the work by bolts 44 passing through slots in the carriage. The rolls 35 are similarly adjustable by bolts 45 passing through slots, see Fig. 3.

From the foregoing it will be observed that the carriage 11 carries the electrode, the means for operating it, the positioning rolls, the spreader and the follower.

The carriage is operated as follows, see

Figs. 1, 2 and 4. 50 represents a motor which rotates a bevel gear 51 which drives a bevel gear 52 on the vertical shaft 53. The latter is supported in a bracket 54 and carries a friction disk 55 which drives a friction roller 56 splined to a shaft 57. The latter carries worms 58, 58 which drives worm wheels 59, 59 on the carriage driving shafts 60, 60. The worm wheels are shown dotted in Fig. 1. 61, 61 represents split nuts in threaded engagement with the shafts 60. The nuts are carried on slides 62 in brackets 63 secured to the carriage. By rotating the handles 64 on the cam disks 65 the nuts are brought into or out of mesh with the screw shafts 60 in a well known manner. The shafts 60 pass freely through the carriage 11 but when the nuts are brought into engagement with the shafts and the latter are rotated the carriage is moved on the runways as is obvious. 66 are stops adjustably secured to the runways 4 and 5 by bolts 67. When the carriage is moved to the right in Fig. 1, that is to the rear, and the handles 64 abut the stops 66 the nuts 61 are automatically released from the screw shafts 60, whereby the carriage is automatically stopped in position to start the weld. The screw shafts 60 are reversed to run the carriage back by simply shifting friction roll 56 to the other side of the machine as is obvious. The friction roll 56 may be moved by hand to adjust the speed of the shafts 60 and the speed of the carriage and also to reverse the latter, or a mechanism such as shown in Fig. 3 for shifting friction roll 25 may be employed.

The arc may be drawn automatically when the machine commences to operate. In the present instance it is done by inserting a carbon pencil momentarily between the end of the electrode and the work. A device for performing this function is shown in Figs. 5 and 6 in which 70 represents the carbon pencil secured in a holder 71 provided with two arms 72 pivoted at 73 on a bracket 74 adjustably secured to the carriage by bolts 75 passing through slots 76 shown on Fig. 3 also. The holder is operated to swing the carbon pencil down to draw the arc and up again after the arc has been drawn. To this end there is provided a shaft 77 in the said bracket 74 and fast on said shaft is a center arm 78 and two outside arms 79, 79 which latter engage the holder arms 72 to force the holder down. The arm 78 is pivoted to the core 80 of the arc solenoid 81. When the solenoid is energized the arm 78 is pulled up, and the arms 79 pushed down which in turn force the holder arms 79 down which brings the carbon pencil 70 in contact with the electrode 13 and the work 1—2 to draw the arc. Immediately thereafter the solenoid is deënergized by a make and break device 93 hereinafter explained, the core drops, the arms 79 move up and the holder arms are automatically lifted by the springs 82. Fig. 5 shows the parts in position the moment the arc is drawn.

Referring further to Fig. 5 the reference numeral 85 represents the starting rheostat having the handle 86 and the holding magnet 87 in series with the resistance 88. 89 is the one main line connected to the rheostat and current passes to the motor 50 by wire 90 and to the field 91 by wire 92. In order to energize the arc-solenoid 81 momentarily to draw the arc there is provided a make and break device 93 operated by a switch solenoid 94 in the shunt 95 from wire 90. The solenoid 94 is mounted upon a box 96 in which there is pivoted at 97 two opposed switch blades each comprising a contact 98 and a non-conducting tail piece 99. The core of the solenoid 94 carries a bridge 100. Normally the core is down and the switch blades are lying horizontally as shown dotted in Fig. 7 in which position they are held by spring fingers 101. As soon, however, as the current is put on by the rheostat handle being turned over to connect with the resistance 88, the solenoid 94 is energized and its core with the bridge 100 lifted which thus connects the contacts 98 and turns the switch blades on their pivots 97 to which the terminals of the circuit 102, including a local source of electrical energy 103 and the solenoid 81, are connected. The closing of the circuit 102 energizes the solenoid 81 which operates the carbon pencil to draw the arc as explained. But as the bridge 100 continues its upward movement it turns the switch blades into vertical position as shown in Fig. 7 whereby the circuit 102 is again broken, the solenoid 81 is deënergized and the carbon pencil is lifted after the arc has been drawn.

As illustrated, the solenoid 94 will remain energized as long as the current is on in the shunt 95, 95, but it may easily be made to short circuit itself if desired by any one skilled in the art. When, however, the solenoid 94 is deënergized, and its core drops, the bridge 100 will in its fall abut the non-conducting tail pieces 99 and kick the switch blades back into their normal horizontal position where they will be caught by the springs 101. Thus it is apparent that only when the starting rheostat is operated is the circuit 102 closed momentarily by way of the shunt 95 and make and break device 93.

The diagram in Fig. 5 includes still another feature of the invention. When the current is turned on full to drive the motor 50 which in turn drives the shafts 60 to operate the carriage, the handle 86 is held by the holding magnet 87 as usual. The moment the arc is drawn a solenoid 105 in the arc circuit 10, 22 is energized and remains so while the arc is made, 106 being the local source of electrical energy in the arc circuit. When the arc breaks the solenoid 105 is deënergized and a bridge 107 drops on the contacts 108 in the holding magnet circuit 109 thereby short circuiting the holding magnet. The handle 86 is pulled back by the operator or by opening the usual line switch not shown on off-contact 110 and the motor 50 is cut out and the carriage 11 ceases to travel.

From the foregoing all the elements of the invention will be understood. It will be seen that means are provided for supporting the work and supplying current thereto. That a supply of metallic electrode is provided which is fed continuously to the arc and at the same time is moved along the joint to be welded while current is supplied to the electrode. Further, that means are provided for positioning the work and finishing the weld by the follower. The mechanical features include the automatic movement of the carriage in either direction and the automatic stopping thereof. The reverse movement of the carriage need not influence the electrode feed because the one feed roll can be moved away from the electrode by operating the handwheel 21 in Fig. 3. The speed of the various elements may also be regulated to produce the best results. Immediately upon the starting of the machine the arc is drawn automatically and when the arc breaks the machine is automatically stopped. By these means and the features of the invention electric arc welding may be carried on rapidly on a large scale with but little attendance by the operator.

If desired the make and break device for drawing the arc automatically may be placed on the starting rheostat in which case it may have the form shown in Fig. 8 in which the handle 86 carries a cam 115 which operates a lever 116 pivoted at 117 to make contact with a fixed contact 118 to close the circuit 102 for the solenoid 81. When the handle is turned into running position the cam 115 has been turned so far to the left that it is clear of the lever 116 which is then pulled away from contact 117 by a spring 119 and the circuit 102 is again open as before. The return movement of handle 86 only serves to move the lever 116 still farther away from contact 118.

Fig. 9 illustrates a suitable support for a cylinder or tube to be welded and to be used in place of the supports 3 referred to above. The tube 120 is laid on a beak 121 with the joint uppermost and in position under the electrode. A removable transverse bar 122 supports the free end of the beak and a stop 123 prevents displacement of the tube.

Figs. 10 and 11 illustrate a machine in which the carriage 11 is bolted fast to the machine at 125. The electrode feed rolls 14 are driven as before but by means of bevel gears 126, 127 from the line shaft 128. The latter is supported on the machine and is driven by worm wheel 129 and worm 130 on shaft 131 which is driven by a worm wheel 132 and worm 133 on the shaft 134, which is a screw shaft in threaded engagement with one or more nuts 135 on the work support 136 which is movable and slides in grooves 137 on the frame of the machine. The shaft 134 is driven from the disk 155 and roller 156 by a worm wheel 138 meshing with a worm (not shown) on the shaft 139 which carries the roller 156 which corresponds to the roller 56 in Fig. 2.

Thus it is optional to use a movable or a stationary work supporting means, and a stationary or movable electrode.

It is obvious that the invention as illustrated and described is susceptible of many changes or variations in the construction and operation of the various automatic sub-mechanisms or other details and it is to be understood that nothing in the foregoing specification is to be taken as a limitation in the carrying out of the invention otherwise than as required by the scope of the appended claims.

We claim:

1. In an automatic welding machine the combination of means for supporting the articles to be welded, an electrode, a welding arc circuit connected thereto and to the said supporting means for the articles and between which an arc is adapted to be drawn and means for automatically moving the electrode along the joint between the articles to be welded.

2. In an automatic welding machine the combination of means for supporting the articles to be welded, an electrode, a welding arc circuit connected thereto and the said supporting means for the articles to be welded, means for automatically moving said electrode along the joint of the articles to be welded and between which and said electrode an arc is adapted to be drawn and means operative upon the rupture of said arc for automatically stopping the moving of the said electrode.

3. In an automatic welding machine the combination of means for supporting the articles to be welded, a supply of electrode material, an arc welding circuit connected to the latter and the said articles and between which an arc is adapted to be drawn and means for continuously feeding the said electrode material to the arc to maintain the same.

4. In an automatic welding machine the combination of means for supporting the articles to be welded, a supply of electrode material, an arc welding circuit connected to the latter and the said articles and between which an arc is adapted to be drawn and means for continuously and automatically feeding the said electrode material to the arc to maintain the same.

5. In an automatic welding machine the combination of means for supporting the articles to be welded, a supply of electrode material, an arc welding circuit connected to the latter and the said articles and between which an arc is adapted to be drawn, means for continuously and automatically feeding the said electrode material to the arc to maintain the same, and means operative upon the rupture of the arc for automatically stopping the feeding of the electrode material.

6. In an automatic welding machine the combination of means for supporting the articles to be welded, a supply of electrode material, a welding arc circuit connected to the latter and the said articles and between which an arc is adapted to be drawn, means for feeding electrode material continuously to the arc to maintain the latter, mechanism for moving the electrode along the joint of the articles to be welded while the arc is maintained and means operative upon the rupture of the arc for automatically stopping the feeding of the electrode material and the movement of the electrode along the said joint.

7. In an automatic welding machine the combination of an electrode, an arc welding circuit connected thereto and to the articles to be welded and between which an arc is adapted to be drawn, mechanism for moving the electrode along the joint of the articles to be welded, an electric circuit for operating said mechanism and means operative upon the rupture of the arc for automatically opening the said last named circuit.

8. In an automatic welding machine the combination of an electrode, an arc welding circuit connected thereto and to the articles to be welded and between which an arc is adapted to be drawn, mechanism for moving the electrode along the joint of the articles to be welded, an electric circuit for operating said mechanism, means operative upon the closing of the said last named circuit for drawing the arc, and means operative upon the rupture of the arc for automatically opening the said last named circuit.

9. In an automatic welding machine the combination of an electric circuit comprising a source of electric energy and two relatively movable terminals between which an arc is adapted to be drawn, means for moving one of the said terminals, an electric circuit included in said means, mechanism operative upon the closing of said last named circuit for drawing the arc between the two named terminals, and means operative upon the rupture of the arc for opening the said last named circuit.

10. In an automatic welding machine the combination of an electric circuit comprising a source of electric energy and two terminals between which an arc is adapted to be drawn, an electric circuit for operating said machine and comprising a rheostat and a holding magnet and means operative upon the rupture of the arc for short circuiting the holding magnet to open said last named electric circuit.

11. In an automatic welding machine the combination of an electric circuit comprising a source of electric energy and two terminals between which an arc is adapted to be drawn, an electric circuit for operating said machine and comprising a rheostat and a holding magnet, means automatically actuated by the closing of said last named circuit for drawing the arc and means operative upon the rupture of the arc for short circuiting the holding magnet to open said last named electric circuit.

12. In an automatic welding machine the combination of an electric circuit comprising a source of electric energy and two terminals between which an arc is adapted to be drawn, a second electric circuit for operating said machine, a third electric circuit comprising a make and break device and an arc drawing mechanism and electrical connections between said make and break device and said second circuit for momentarily operating said make and break device to close said third circuit to operate the arc drawing mechanism to draw the arc and to open said third circuit immediately after the arc has been made.

13. In an automatic welding machine the combination of a welding circuit comprising a source of electric energy and two terminals between which an arc is adapted to be drawn, a first electric circuit for operating said machine and comprising a rheostat and a holding magnet, a second electric circuit comprising a make and break device and an arc drawing mechanism, electrical connections between said make and break device and said first electric circuit for operating said device to momentarily close said second circuit to operate said arc drawing mechanism to draw the arc and means operative upon the rupture of the arc and included in said welding circuit for short circuiting said holding magnet to open said first electric circuit.

14. In an automatic welding machine the combination of means for supporting the articles to be welded, a movable carriage, a movable metallic electrode supported thereon, means for moving said carriage over the said articles, means for continuously feeding the said electrode to the point where the arc is to be made between said electrode and the said articles and while the said carriage is moving, a spreader supported on the carriage to move in advance of said electrode to space the articles apart, a follower supported on said carriage to move behind said electrode to smooth the welded joint and positioning means for keeping the articles to be welded in place on the said supporting means.

Signed at Garwood, New Jersey, this 6th day of October, 1913.

WILLIAM L. CALLAHAN.
JOSEPH W. RAYNOR.

Witnesses:
E. WALTER JOHNSON,
PETER F. HOFFMAN.